US006609205B1

United States Patent
Bernhard et al.

(10) Patent No.: US 6,609,205 B1
(45) Date of Patent: Aug. 19, 2003

(54) NETWORK INTRUSION DETECTION SIGNATURE ANALYSIS USING DECISION GRAPHS

(75) Inventors: Thomas E. Bernhard, Round Rock, TX (US); Steven D. Shanklin, Austin, TX (US); Gerald S. Lathem, Elgin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/272,927

(22) Filed: Mar. 18, 1999

(51) Int. Cl.[7] .............................................. G06F 11/00
(52) U.S. Cl. ...................... 713/201; 713/200
(58) Field of Search ................... 713/200, 201, 713/202

(56) References Cited

U.S. PATENT DOCUMENTS

| | | | |
|---|---|---|---|
| 5,032,979 A | 7/1991 | Hecht et al. ................ 364/200 |
| 5,101,402 A | 3/1992 | Chiu et al. .................. 370/17 |
| 5,278,901 A | 1/1994 | Shieh et al. .................... 380/4 |
| 5,414,833 A | 5/1995 | Hershey et al. ............ 395/575 |
| 5,448,724 A | 9/1995 | Hayashi .................. 395/182.02 |
| 5,488,715 A | 1/1996 | Wainwright ............ 395/182.02 |
| 5,524,238 A | 6/1996 | Miller et al. ................ 395/600 |
| 5,557,742 A | * | 9/1996 | Smaha et al. ............... 713/200 |
| 5,606,668 A | 2/1997 | Shwed ................... 395/200.11 |
| 5,621,889 A | 4/1997 | Lermuzeaux et al. ........ 395/186 |
| 5,640,319 A | * | 6/1997 | Beuning et al. ............. 379/219 |
| 5,699,513 A | 12/1997 | Feigen et al. ........... 395/187.01 |
| 5,793,763 A | 8/1998 | Mayes et al. ................ 370/389 |
| 5,796,942 A | 8/1998 | Esbensen ............... 395/187.01 |
| 5,798,706 A | 8/1998 | Kraemer et al. ......... 340/825.07 |
| 5,805,801 A | 9/1998 | Holloway et al. ...... 395/187.01 |
| 5,826,014 A | 10/1998 | Coley et al. ........... 395/187.01 |
| 5,919,257 A | 7/1999 | Trostle ....................... 713/200 |
| 5,931,946 A | 8/1999 | Terada et al. ............... 713/201 |
| 5,991,881 A | 11/1999 | Conklin et al. ............. 713/201 |

OTHER PUBLICATIONS

"Preliminary Report on Advanced Security Audit Trail Analysis on UNIX," N. Habra et al., pp. 1–34 (found at htp://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

(List continued on next page.)

Primary Examiner—Ly V. Hua
(74) Attorney, Agent, or Firm—Baker Botts L.L.P.

(57) ABSTRACT

A method of detecting signatures representing misuse of a local network. Known reference signatures having one or more common events are identified, and represented with a decision graph having one or more shared nodes. Each node of the decision graph represents the occurrence of an event. Given a set of input events, test functions associated with nodes determine the path taken during traversal of the graph. A path of the graph from the parent node to a leaf node represents the occurrence of all events that comprise a signature. The decision graph permits any of the signatures to be detected with only one traversal, and avoids the need for a separate matching process for each signature. In this manner, an entire set of all known reference signatures may be consolidated into a smaller set of decision graphs.

37 Claims, 3 Drawing Sheets

OTHER PUBLICATIONS

"An Introduction to Intrusion Detection," A. Sundaram, pp. 1–10, (found at http://www.cs.purdue.edu/coast/archive/data/categ24.html).

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html).

"An Application of Pattern Matchine in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16., (found at http://www.cs.purdue.edu/coast/archive/data/categ30.html).

"Secure RPC Authentication (SRA) for TELNET and FTP", D.R. Safford, et al., pp. 1–5 (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wieste Venema, 8 pages., (found at http://www.cs.purdue.edu/coast/archive/data/categ30.html).

"Characteristics of Wide–Area TCP/IP Consversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html.).

"Internetwork Security Monitor: An Intrusion–Detection System for Large–Scale Networks", L.T. Heberlein et al., *Proc. of the 15th National Computer Security Conference*, Oct. 1992, pp. 262–271.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2, 1999*, pp. 1–47, (found at http://seclab.cs.ucdavis.edu/papers.html), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers/html.), Oct. 17, 1998.

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers/html.), May 1998.

"Stack and Queue Integrity on Hostile Platforms", P.T. Devanbu, et al., *IEEE Symposium on Security and Privacy*, Oakland CA, ( (found at http://seclab.cs.ucdavis.edu/papers/html.), 1998.

"Techniques for Trusted Software Engineering", P.T. Devanbu et al., *Proceedings of the 20th International Conference on Software Engineering*, Kyoto, Japan, (found at http://seclab.cs.ucdavis.edu/papers/html.), 1998.

"Data Level Inference Detection in Database Systems", R.W. Yip et al., *Proceedings of the 11th IEEE Computer Security Foundation Workshop*, Rockport, Massachusetts, (found at http://seclab.cs.ucdavis.edu/papers/html.), 1998.

"The Design and Implementation of a Data Level Inference Detection System", Yip et al., *Proceedings of the Twelfth Annual IFIP WG 11.3 Working Conference on Database Security*, Chalkikiki, Greece 14 pages, (found at http://seclab.cs.ucdavis.edu/papers/html.), 1998.

"Theft of Information in the Take–Grant Protection Model", Matt Bishop, 35 pages, *Journal of Computer Security* 4(4)(1996), (found at http://seclab.cs.ucdavis.edu/papers/html.), Mar. 13, 1997.

"Information Survivability, Security, and Fault Tolerance", Matt Bishop, position paper for the Information Survivability Workshop *Journal of Computer Security #6*) 1 page, (found at http://seclab.cs.ucdavis.edu/papers/html.), 1997.

"Teaching Computer Security", Matt Bishop, position paper for the *Workshop on Education in Computer Security*, Monterey CA, 3 pages, (found at http://seclab.cs.ucdavis.edu/papers/html.), 1997.

"Protecting Routing Infrastructures from Denial of Service Using Cooperative Intrusion Detection", S. Cheung at al., *Proc. new Security Paradigms Workshop*, Cumbria, UK 13 pages, (found at http://seclab.cs.ucdavis.edu/papers/html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers/html.), 1997.

"Cryptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers/html.), 1997.

"Property–Based Testing; A New Approach to Testing for Assurance", Fink et al., *ACM SIGSOFT Software Engineering Notes*, 22(4), (found at http://seclab.cs.ucdavis.edu/papers/html.), 1997.

"Checking for Race Conditions in File Accesses", Bishop et al., *Computing Systems* 9(2)., (found at http://seclab.cs.ucdavis.edu/papers/html.), 1996.

"An Isolated Network for Research", Bishop et al., *The 19th NISSC*, pp. 1–9, (found at http://seclab.cs.ucdavis.edu/papers/html.), 1996.

"Goal–Oriented Auditing and Logging", Bishop et al., submitted to IEEE Transactions on Computing Systems, (found at http://seclab.cs.ucdavis.edu/papers/html.), 1996.

"Extending The Take–Grant Protection System", J. Frank et al., The IEEE Oakland Conference on Research in Security and Privacy., (found at http://seclab.cs.ucdavis.edu/papers/html.), Dec. 5, 1996.

Network Security Via Reverse Engineering of TCP Cole: Vulnerability Analysis and Proposed Solutions, Guha et al., *Proc. of the IEEE Infocom '96*, San Francisco, CA (found at http://seclab.cs.ucdavis.edu/papers/html.), 1996.

"Attack Class: Address Spoofing", Heberlein et al., The 19th National Information Systems Security Conference, (found at http://seclab.cs.ucdavis.edu/papers/html), 1996.

PhD. Theses entitled Execution Monitoring Of Security––Critical Programs In A Distributed System: A Specification–Based Approach, Calvin Cheuk Wang Ko, 111 pages, (found at http://seclab.cs.ucdavis.edu/papers/html), 1996.

"A Methodology for Testing Intrusion Detection Systems", Puketza et al., *IEEE Transactions on Software Engineering*, vol. 22, No. 10, (found at http://seclab.cs.ucdavis.edu/papers/html), 1996.

"The Exact Security of Digital Signatures—How to Sign with RSA and Rabin", Bellare et al. Earlier version appears in *Advances in Cryptology–Eurocrypt '96*, LNCS vol. 1070, U. Maurer ed., Springer–Verlag, pp. 399–416), (found at http://seclab.cs.ucdavis.edu/papers/html), 1996.

"How to Protect DES Against Exhaustive Key Search", Kilian et al., Advances in Cryptology—CRYPTO '96., (found at http://seclab.cs.ucdavis.edu/papers/html), 1996.

"GrIDS–A Graph Based Intrusion Detection System For Large Networks", Staniford–Chen et al., *The 19th NISSC*. 10 pages, (found at http://seclab.cs.ucdavis.edu/papers/html), 1996.

"NetKuang—A Multi–Host Configuration Vulnerability Checker", Zerkle et al., *Proc. of the 6th USENIX Security Symposium*, San Jose, CA., (found at http://seclab.cs.ucdavis.edu/papers/html), 1996.

"A Standard Audit Trail Format", Matt Bishop, *Proc. of the 1995 NISSC*, Baltimore, MD., (found at http://seclab.cs.ucdavis.edu/papers/html), 1995.

Abstract entitled Theft of Information in the Take–Grant Protection Model, Matt Bishop, *Journal of Computer Security*, vol. 3, No. 4, (found at http://seclab.cs.ucdavis.edu/papers/html.), 1995.

"Improving System Security via Proactive Password Checking", Matt Bishop, *Computers & Security*, vol. 14, No. 3, pp. 233–249, (found at http://seclab.cs.ucdavis.edu/papers/html), 1995.

"Simulating Concurrent Intrusions for Testing Intrusion Detection SystemsL Parallelizing Intrustions", Chung et al., *Proc. of the 1995 NISSC*, Baltimore, MD, 11 pages, (found at http://seclab.cs.ucdavis.edu/papers/html.), 1995.

"Network Security Monitor", L. Todd Heberlein, *Lawrence Livermore National Laboratory project deliverable*, (found at http://seclab.cs.ucdavis.edu/papers/html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers/html), 1995.

"MCF: A Malicious Code Filter", R.W. Lo et al., *Computers & Security*, (1995) vol. 14, No. 6. (27 pages.), (found at http://seclab.cs.ucdavis.edu/papers/html).

"Entity Authentication and Key Distribution". Bellare et al., *Advances in Cryptology—CRYPTO '93*, Santa Barbara, CA, Aug. 1993, pp. 232–249. (found at http://seclab.cs.ucdavis.edu/papers/html).

"Random Oracles are Practical: A Paradigm for Designing Efficient Protocols", Bellare et al., *Proc. of the 1st ACM Conference on Computer and Communication Security*, Fairfax, VA, Nov. 1993, pp. 1545–164. (found at http://seclab.cs.ucdavis.edu/papers/html).

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers/html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers/html), 1992.

DIDS (Distributed Intrusion Detection System)—Motivation, Architecture, and An Early Prototype, Snapp et al., *Proc. 14th National Computer Security Conference*, Washington, DC (9 pages.) (found at http://seclab.cs.ucdavis.edu/papers/html), 1991.

"Proactive Password Checking", Matt Bishop, *Proc. of the 7th International Conference on Information Security*, May 1991, pp. 169–181. (found at http://seclab.cs.ucdavis.edu/papers/html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers/html), 1992.

Abstract entitled "Collaboration Using Roles" by M. Bishop, *Software—Practice and Experience*, vol. 20, No. 5, May 1990. (found at http://seclab.cs.ucdavis.edu/papers/html).

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers/html).

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy*, Oakland, CA, May 7–9, 1990, pp. 86–94, (found at http://seclab.cs.ucdavis.edu/papers/html).

Abstract entitled "A Network Security Monitor" by L.T. Heberlein, G.V. Dias, K.N. Levitt, B. Mukherjee, and others, *Proc. of the 1990 IEEE Symposium on Research in Security and Privacy*, Oakland, CA, May 7–9, 1990, pp. 296–304, (found at http://seclab.cs.ucdavis.edu/papers/html).

"Bucket Hashing and its Application to Fast Message Authentication", Phillip Rogaway, *Acvances in Cryptology—CRYPTO '95*, (found at http://seclab.cs.ucdavis.edu/papers/html), 1995.

"Provably Secure Session Key Distribution—The Three Party Case", Bellare et al., *Proc., of the 27th Annual ACM Symposium on Theory of Computing*, Las Vegas, NV, (found at http://seclab.cs.ucdavis.edu/papers/html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers/html), Oct. 1995.

"Holding Intruders Accountable on the Internet", Staniford–Chen et al., *Proc. of the 1995 IEEE Symposium on Security and Privacy*, Oakland, CA, (11 pages) (found at http://seclab.cs.ucdavis.edu/papers/html), 1995.

"LAFS: A Logging and Auditing File System", Christopher Wee, *Proc. of the 11th Computer Security Applications Conference*, 10 pages, (found at http://seclab.cs.ucdavis.edu/papers/html), 1995.

"Towards a Property–based Testing Environment with Applications to Security–Critical Software", Fink et al., *Proc. of the 4th irvine Software Symposium*. 10 pages (found at http://seclab.cs.ucdavis.edu/papers/html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers/html), Dec. 1994.

"Arificial intelligence and Intrusion Detection: Current and Future Directions", Jeremy Frank. *Proc. of the 17th National Computer Security Conference*. 12 pages, (found at http://seclab.cs.ucdavis.edu/papers/html), 1994.

"Automated Detection of Vulnerabilities in Privileged Programs by Execution Monitoring", Ko et al., *Proc. of the 10th Annual Computer Security Applications Conference*, Orlando, FL. (found at http://seclab.cs.ucdavis.edu/papers/html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers/html), 1994.

"Network Intrustion Detection", Mukherjee et al., *IEEE Network*, May–Jun. 1994, vol. 8, No. 3, pp. 26–41. (found at http://seclab.cs.ucdavis.edu/papers/html), 1994.

"A New Suggestion for How to Encrypt with RSA", Bellare et al., *Eurocrypt '94*, 20 pages, (found at http://seclab.cs.ucdavis.edu/papers/html), 1994.

"The Security of Cipher Block Chaining", Bellare et al., *Advances in Cryptology—CRYPTO '94*, Santa Barbara CA. (19 pages.) (found at http://seclab.cs.ucdavis.edu/papers/html), 1994.

"Analysis Of An Algorithm For Distributed Recognition And Accountability", Ko et al., *Proc. 1st ACM Conference on Computer and Communication Security*. Fairfax, VA, Nov. 1993, 11 pages, (found at http://seclab.cs.ucdavis.edu/papers/html).

Product description for "Oil Change" located on the Internet at http://store.mcafee.com/product.asp?ProductID=28&CategoryID–12, pp. 1–2.

Net Ranger 1.3 Usr's Guide, Copyright © 1997 by WheelGroup Corporation, Net Ranger product first available summer of 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

Abstract entitled "Static Analysis Virus Detection Tools for UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers/html).

Abstract entitled "Security with Low Communication Overhead" by D. Beaver, et al., *Proc. Advances in Cryptology— CRYPTO '90*, Santa Barbara, CA, Aug. 11–15, 1990, pp. 62–76, (found at http://seclab.cs.ucdavis.edu/papers/html).

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers/html).

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers/html).

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–35. (found at http://seclab.cs.ucdavis.edu/papers/html).

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers/html).

Abstract entitled "Password Management" by M. Bishop, *COMPCON Spring '91. Digest of Papers*. San Francisco, CA, Feb. 25–Mar. 1, 1991, pp. 167–169. (found at http://seclab.cs.ucdavis.edu/papers/html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers/html).

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers/html).

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Theses entitled "Paradigms for the Reduction of Audit Trails" by B. Wetmore, pp. i–6. Unable to obtain entire thesis—portion downloaded from http://seclab.cs.ucdavis.edu/papers/html., 1993.

"Open System Security—an Architectural Framework" by Arto T. Karila, (found at http://seclab.cs.ucdavis.edu/papers/html), Jun. 1991.

"Introduction to Algorithms," by Thomas H. Cormen, Charles E. Leiserson, Ronald L. Rivest, Chap. 34, pp. 853–885, Copyright © 1990.

* cited by examiner

NETWORK INTRUSION DETECTION SIGNATURE ANALYSIS USING DECISION GRAPHS

TECHNICAL FIELD OF THE INVENTION

This invention relates to computer networks, and more particularly to prevention of unauthorized access to a local network from computers external to the local network.

BACKGROUND OF THE INVENTION

Prevention of unauthorized access by outsiders to a computer network is a part of any network management program. This security problem has been complicated by recent trends in internetworking of a previously isolated private networks with value added networks, public networks (such as the internet), and with the networks of other enterprises.

Firewalls are one approach to preventing unauthorized access. Essentially, a firewall is a control layer inserted between an enterprise's network and the outside. It permits only some traffic to pass through. The firewall is configured by the administrator of the local network based on the enterprise's security policy. For example, the firewall may block traffic of a certain type, traffic from certain addresses, or traffic from all but a predetermined set of addresses.

Techniques used by network intruders for penetrating network system security have evolved in pace with sophisticated methods for detecting the intruders. Detection methods include software solutions, specifically, software intrusion detection systems, which continually monitor network traffic and look for known patterns of attack.

When an intrusion detection system detects inappropriate activity, it generates appropriate alarms and provides other responses while the attack is occurring. For example, the intrusion detection system might report the attack, log the attack, and terminate the misused connection.

One approach to intrusion detection relies on known patterns of unauthorized activity, referred to as "signatures". These signatures are stored, and, in real time, compared to the packet flow incoming to the network. If a match is found, the incoming datastream is assumed to be misused.

Many existing intrusion detection systems are host-based rather than network based. A host-based system resides on a particular host computer and detects only attacks to that host. A host-based system is described in U.S. Pat. No. 5,557,742, entitled "Method and System for Detecting Intrusion and Misuse of a Data Processing System".

A network-based system is connected at some point on a local network and detects attacks across the entire local network.

As an example of network-based intrusion detection, one known pattern of unauthorized access is associated with "IP spoofing", whereby an intruder sends messages to a computer with an IP address indicating that the message is from a trusted port. To engage in IP spoofing, the intruder must first use a variety of techniques to find an IP address of a trusted port and must then modify the packet headers so that it appears that the packets are coming from that port. This activity results in a signature that can be detected when matched to a previously stored signature of the same activity.

For signatures indicated by a single packet, the detection process can be as simple as matching a binary string of an incoming packet to a stored binary string. However, for composite signatures, the detection process often requires the use of procedural code, involving loops, counts, comparisons and other processing mechanisms. For this reason, conventional signature detection methods require a skilled programmer to write the signatures.

Once signatures are defined, some sort of signature analysis engine must be developed to compare incoming data to a stored collection of known reference signatures. Various pattern matching techniques are possible, as are various techniques for structuring the stored reference signatures so as to facilitate the matching process.

SUMMARY OF THE INVENTION

One aspect of the invention is a method of using a decision graph to detect signatures representing misuse of a local network. A set of known signatures having one or more common events are identified, and represented with a decision graph having a node for each common event. From the common node, the graph may branch to lower level nodes, each lower level node representing an event associated with only one (or some) of the signatures. Leaf nodes represent the bottom of a path of events that comprise a signature. The path down the decision graph depends on the outcome of "test" functions associated with each node other than leaf nodes. The decision graph permits a search for multiple signatures with only one traversal of the decision graph, and avoids the need for a separate matching process for each signature.

As a very simple example of a decision graph, two different signatures might have the same parent node. The parent node might then have two test functions, the outcome of which cause a branch into separate paths. Each path represents a sequence of events unique to each signature.

An advantage of the invention is that an entire set of reference signatures can be consolidated into a smaller set of decision graphs. The use of a single decision graph for multiple signatures results in more efficient processing. Signatures having common events can be identified, and decision graphs optimized so that they represent those signatures that are most efficiently processed together. Each common event in a decision graph results in one matching step for that event rather than one matching step for each signature. Depending on the number of common events that are processed together, the overall reduction in the processing load can be substantial.

DETAILED DESCRIPTION OF THE INVENTION

Intrusion Detection System Overview

Figure 1:
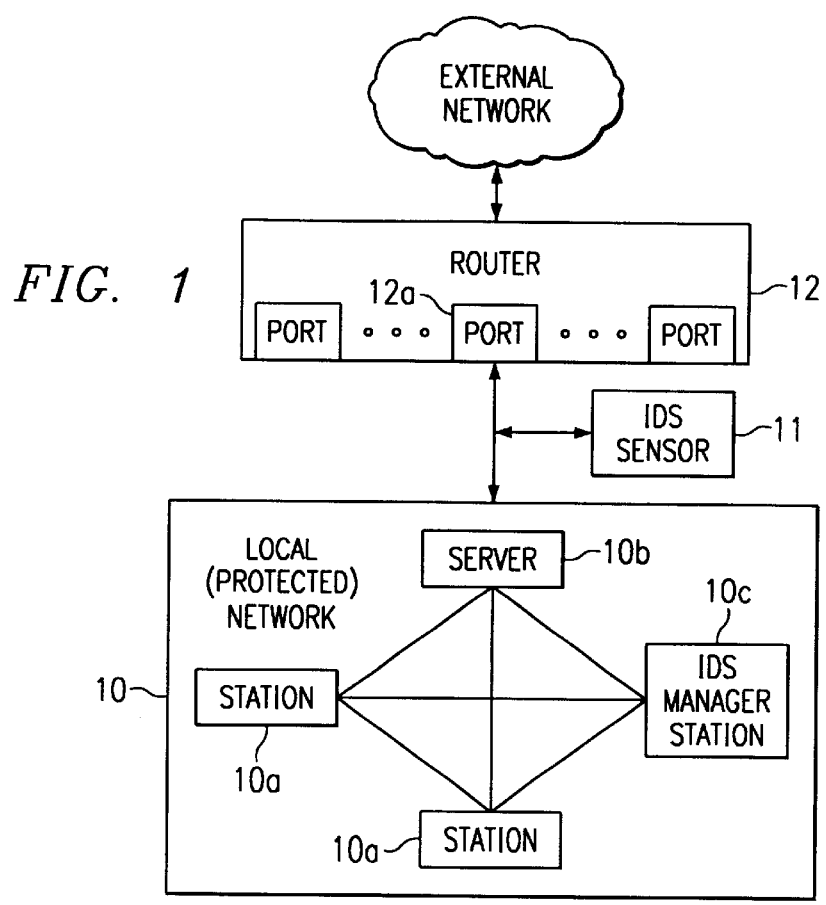
FIG. 1 illustrates a typical intrusion detection system that analyzes network intrusion signatures.

FIG. 1 illustrates a typical computer network, with a "local network" 10 protected by an intrusion detection system (IDS) sensor 11 in accordance with the invention. The local network 10 is the network being secured, with the rest of the network being referred to herein as the "external network". It is assumed that local network 10 receives and sends data in "packets", which are switched between network segments via router 12. "Intrusion detection" is a term familiar in the art of network security. As used herein, it includes the various attacks discussed herein, and in general, any type of misuse that can be indicated by a signature.

Router 12 is of a type known in the field of networking, making connections between networks at the transport layer of the OSI model. Router 12 decides whether to forward a packet by examining the packet's protocol level addresses. Router 12 is capable of handling any datalink protocol, thus, ethernet, FDDI, ISDN, and so on are handled in the same manner.

Router 12 inspects packets incoming from the external network to determine which should be forwarded into the local network 10. Similarly, packets originating in the local network are inspected to determine whether they are to be forwarded to the external network. As stated above, router 12 is a type of "internetworking device" in that it is used to connect separate network segments. A characteristic of a router is its ability to communicate with other routers outside the local network 10 to determine the best routes for network traffic.

As explained below, sensor 11 analyzes packets to determine if access into and out from local network 10 is misused. Sensor 11 may be implemented as a hardware device or as a combination of hardware and software. Sensor 11 processes a packet by examining its header and payload, as well as its relationship to other packets in the data stream. It detects "signatures" associated with misused access, where a "signature" is an pattern of one or more events represented by strings of binary code.

Although local network 10 is illustrated as having a "mesh" type topology, this is for purposes of example. Local network 10 could be any system of interconnected computer stations 10a, typically having a server 10b to function as a sort of gateway to network resources.

Local network 10 may include an IDS manager station 10c, which provides system management personnel with a user interface and system management functionality especially directed to intrusion detection and response. In this case, sensor 11 might forward alarms to station 10c, which may then alert the system manager or automatically take action. Alternatively, sensor 11 may autonomously comprise the entire intrusion detection system. In this case, sensor 11 may have appropriate functionality so that if it detects an intrusion, it can take appropriate action, such as terminating the connection.

An example of a suitable IDS sensor 11 is the sensor device provided with the NETRANGER intrusion detection system, available from Cisco Systems, Inc. The NETRANGER product also includes director management software for use at station 10c. A feature of the NETRANGER sensors is their ability to monitor almost any type of IP (internet protocol) network, ranging from internet connections, LAN segments, and the network side of dial-in modems. The data link protocol might be any one of various types, such as ethernet, fast ethernet, token ring, or FDDI. However, other types of intrusion detection sensors (often referred to as "signature processors") could be used and other types of protocols can be analyzed.

In the example of this description, which is in terms network traffic using an IP protocol, the packets incoming to local network 10 may adhere to various protocols running on top of the IP protocol or to IP extensions. For example, the IP protocol may have a TCP or UDP protocol running on top of it. The TCP (transmission control protocol) enables two hosts to establish a connection and exchange streams of data and includes various delivery guarantees. The UDP (user datagram protocol) is used primary for broadcasting messages and provides few error recovery services. The ICMP (internet control message protocol) is an extension to IP and supports packets containing various error, control, and informational messages.

In the example of this description, sensor 11 is capable of examining packets for each of these three IP protocols, i.e., TCP, UDP, and ICMP. In today's networking environments, these IP protocols cover most internet traffic. However, the same concepts could be applied to examination of other protocols, including alternatives to IP.

Sensor 11 captures network data, and parses each packet before signature analysis occurs. Various capabilities of sensor 11 to support signature analysis include, but are not limited to, checksum verification, hop count checking, IP option checking, MTU checking for maximum packet size, IP fragment reassembly, TCP stream reassembly, as well as pattern matching.

The signatures detected by sensor 11 include those associated with malicious intent attacks, denial of service attacks, evasion attempts, and other methods of misuse.

Signature Analysis Overview

Signature analysis uses one or more intrusion detection sensors 11, which are installed on a network segment and are transparent to network performance. For purposes of example, the operation of a typical intrusion detection sensor 11 is described herein. However, it should be understood that the basic concepts of the invention are not limited to a particular type of sensor, and can be applied in the context of any hardware/software configuration that is a misuse signature "sensor" in that it performs signature analysis.

A sensor 11 contains a detection engine, which examines each packet incoming to the sensor 11, including its header and payload. The sensor 11 also analyzes each packet's relationship to adjacent and related packets in the data stream. If the analysis indicates misuse, the sensor may act autonomously to take action, such as disconnection, or it may send an alarm to a separate intrusion detection management station.

The signature detection engine of a sensor 11 uses a signature recognition methodology that includes both context and content oriented signature analysis. Context-oriented signatures consist of known network service vulnerabilities that can be detected by inspecting packet headers. Examples of context-oriented signatures are SATAN, TCP Hijacking, and IP spoofing signatures. Content-oriented signatures require the inspection of data fields within a packet to determine if an intrusion has occurred at the application level. These include e-mail and web attack signatures. A sensor 11 might also have the capability to be programmed to analyze packets for customized signatures for a particular network.

Signatures may also be categorized as being either atomic or composite. Atomic signatures comprise information (context or content) in a single packet. Composite signatures comprise information in multiple packets.

Regular Expressions and Logical Operators for Representing Intrusion Signatures

One aspect of the invention is the use of a signature description language to describe intrusion signatures. As explained below, this language is a combination of regular expression and logical expression methodology.

Regular expression methodology is a basic methodology in the art of computer programming. In general, they are used for defining a syntactical structure that can be readily compiled or otherwise analyzed. More specifically, regular expressions are sequences of letters or numbers (ordinary characters), in combination with special operators, which together specify strings. Essentially, a given regular expression provides a shorthand descriptive representation for a string.

An ordinary character is a simple regular expression that matches that same character and nothing else. The following table sets out an example of special characters (symbols) that can be used to form regular expressions. These are consistent with those used in the regular expression syntax associated with the UNIX operating system.

| symbol | definition |
|--------|------------|
| [xyz]  | character class |
| x\|y   | or |
| x*     | zero or more x's |
| x+     | one or more x's |
| x?     | zero or one x |

As examples, AB denotes the set of strings {AB}, the set having just one member. The expression A|B denotes A or B. The expression A*B denotes zero or more A's followed by B. It should be understood that other symbols could be substituted to perform the same type of matching. Another set of examples of regular expression symbols are those associated with the PERL programming language.

As indicated by the above table, regular expression symbols include operators that allow concatenation (such as by adjacent identifiers), alternation (such as by identifiers separated with |), and repetition (such as an identifier followed by *) Precedence is determined by a predefined convention (such as by * highest, then concatenation, then alternation), with deviation permitted by use of a special symbol (such as parentheses).

As applied to signature detection analysis, each type of packet associated with a signature can be described with a unique identifier. A regular expression having identifiers of this type is referred to herein as a "packet-based" regular expression. A packet-based regular expression might have the following form:

"C.*CC [~C] C,

, where C is a defined packet type. Thus, instead of C representing a character as is the case with conventional regular expressions, C represents a packet type.

Regular expressions can be used to describe signatures involving sequences of different packet types. Thus, for example, three different packet types might be defined with the identifiers A, B, and C. An example of a regular expression for a particular sequence of these three packet types is:

A.*BB.*C

For a given stream of packets, any sequence of packet type A, followed by 0 or more packets of any type, followed by two packets of type B, followed by 0 or more packets of any type, followed by a packet of type C, will result in a match.

The use of regular expressions can be extended so that each identifier represents an "event", which could be a single packet, a sequence of packets, or a signature-related event. A signature-related event could be, or could include, a time period, a count, a packet in the opposing direction, or any other conceivable event that could be part of a signature. This type of regular expression is referred to herein as an "event-based" regular expression.

Because signatures often comprise events as well as packets types, the use of regular expression methodology can be combined with logical expression (Boolean) methodology to more completely describe signatures. Logical expressions involve the use of operators that relate parts of an expression so that the outcome is true or false. Logical operators include AND, OR, NOT, and greater than, less than, or equal to.

An example of a signature is a TCP SYN flooding signature, which represents the events associated with a SYN flooding attack. In a SYN flooding attack, an attacker transmits a volume of requests for connections that cannot be completed because of false return addresses. This causes connection queues to fill up, thereby denying service to legitimate users.

When a normal TCP connection begins, a destination host receives a SYN (synchronize/start) packet from a source host and sends back a SYN ACK (synchronize acknowledge) packet. The destination host must then hear an ACK (acknowledge) of the SYN ACK before the connection is established. This is referred to as the "TCP three-way handshake". While waiting for the ACK to the SYN ACK, a connection queue of finite size on the destination host keeps track of connections waiting to be completed. Normally, the queue empties quickly because the ACK usually arrives within a few milliseconds after the SYN ACK. However, when the SYN ACK is destined for a bogus host, the entry remains in the connection queue until a timer expires. The attacker exploits this feature by causing the connection queue to fill and deny TCP service to others.

Thus, the SYN flood attack is characterized by an influx of SYN packets to the same destination (host) from random source IP addresses within a short time period. Using regular expression methodology, the events SYN and ACK can be defined as a pattern that describes a set of packets. Furthermore, logical expression methodology permits the use of the counting aspects of the signature.

An event-based regular expression for a SYN flood signature might be:

For any host
  Count (SYN [~ACK] in Time)>50 FireAlarm

. In other words, the number of SYN packets (but not SYN ACK packets) within a certain time period, Time, is counted. If the number exceeds 50, an alarm signal is generated. The identifiers SYN and ACK represent packet types. The identifiers Time and 50 represent signature-related events.

Another example of an intrusion signature is the SMB authorization failure signature. SMB is a message format used by DOS and Windows operating systems to share files, directories, and devices. The SMB authorization failure signature indicates an attack related to this format. An event-based regular expression for the signature might be:

For any host
  Count (SMBAuthFail)>3 FireAlarm

, which counts the number of SMB authorization failures. The identifier SMBAuthFail represents a packet type. The identifier 3 is a represents a signature-related event.

The above examples use various identifiers and logical symbols to illustrate the use of regular expressions and logical operators. It should be understood that any other type of "token", such as those already familiar to computer programmers, could be used. These additional tokens include a vast variety of reserved words, numerical constants, strings, and punctuation.

The use of regular expressions to represent signatures permits a compiler or other lexical analyzer to be written. In general, a process can be written for both recognizing and evaluating the above-described identifiers, special symbols, or other tokens.

Typically, lexical analysis of regular expressions representing signatures will be performed so as to provide an internal representation of the signature for processing by the sensor 11. Essentially, the processing comprises matching stored signatures to received signatures. The implementation of this matching process is often referred to as the sensor "engine". To this end, the language might be interpreted or compiled to provide a set of procedural instructions. The description might be internally represented as a decision graph, state machine, or some other data structure. Regardless of the particular internal representation, the use of the above-described techniques to describe signatures is amenable to an analysis process that transforms the description to an executable process.

Decision Graphs for Signature Analysis

Regardless of the language and syntax used to describe signatures, the process of searching for matches between an incoming packet stream and stored reference signatures can be accomplished with decision graphs.

Figure 2:
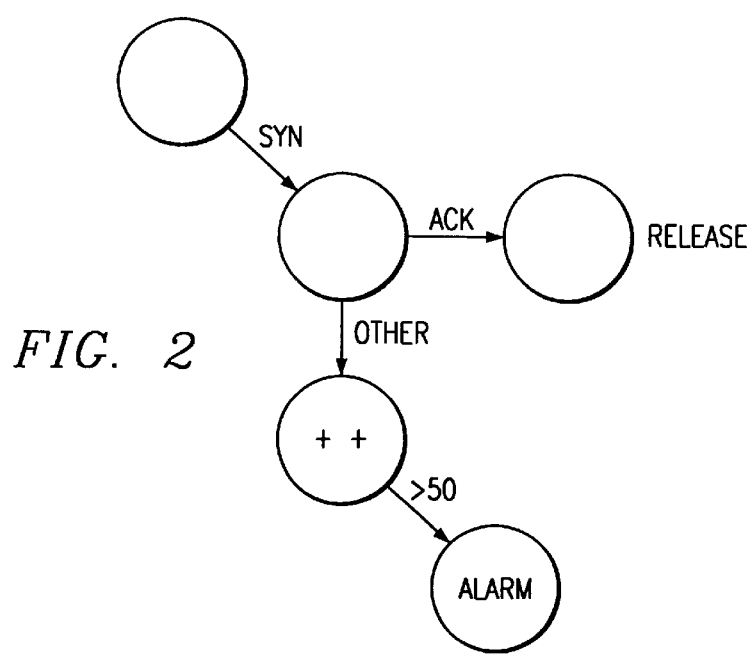
FIG. 2 illustrates a signature represented with a regular expression and expressed as decision graph.

FIG. 2 illustrates how a regular expression for the preceding SYN ACK signature might be represented as a decision graph. In the example of FIG. 2, where the decision graph has no cycles (loops), the graph may also be referred to as a "tree". If a first event, the SYN event, is detected, the process determines whether the ACK event occurs. If not, the process proceeds to a count. At any node, if the associated event does not occur, the process is released. If all events occur, the signature is detected and indicates a misuse.

In general, a decision graph operates so as to process a set of events. The decision graph has nodes, which each represent an event that has occurred. The leaf nodes indicate the end of a path through the decision graph, the path having all the requisite events of a signature. At each node other than a leaf node, transition functions determines the path to the next node or nodes. A particular sequence of input events may be used to traverse the graph so as to end at a leaf node (all events for the associated signature have occurred) or so as to result in no signatures being detected.

A decision graph need not represent a single signature. For example two signatures might both contain a common event or events, such as event A. A decision graph might be used for both signatures and begin with a node representing a test for event A. The graph might then progress differently for the different signatures. Continuing the same example, a first signature having a set of events, [A, B, C] might branch from node A to node B then node C. A second signature having events [A, B, D] might branch from node A to node B then to node D. The path of events from node A to node B would be common to both signatures. The leaf nodes C and D would indicate a path to the first and second signature, respectively.

Figure 3:
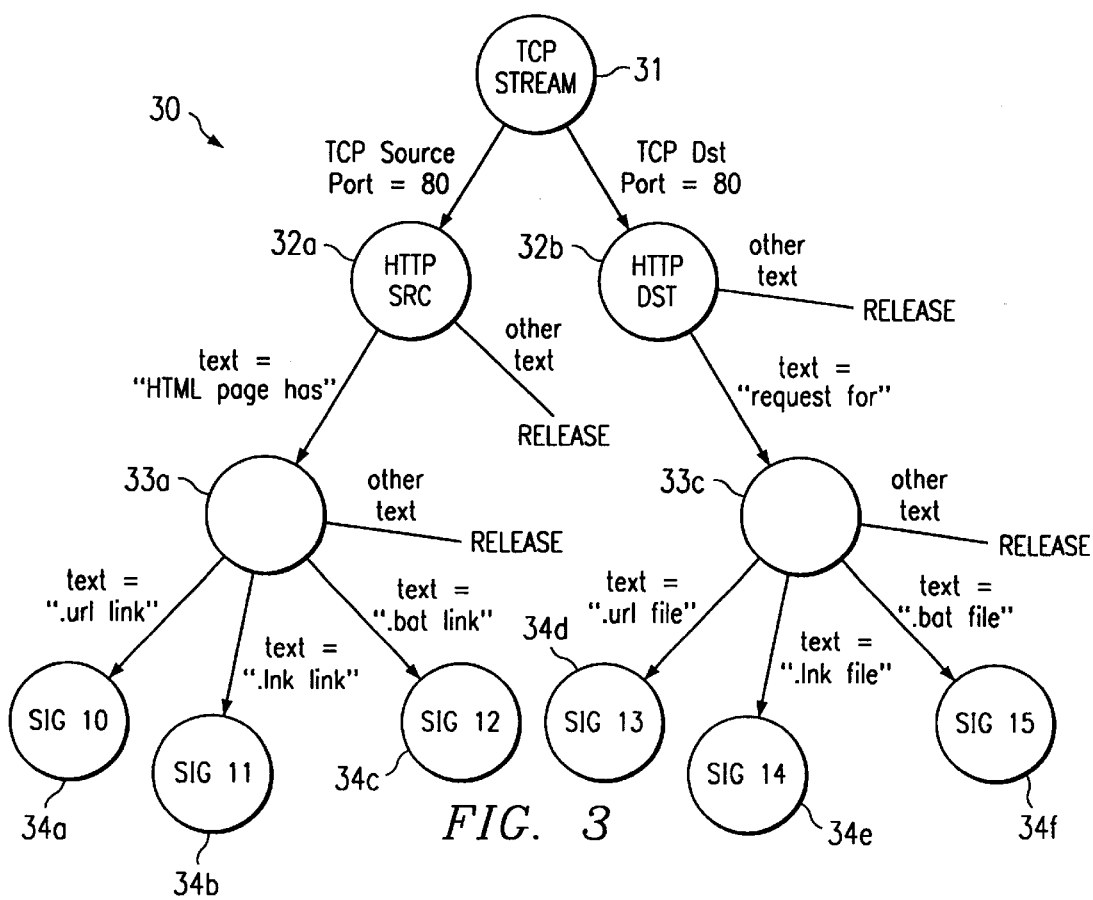
FIG. 3 illustrates a set of six TCP composite signatures represented by a single decision graph.

FIG. 3 illustrates an example of a decision graph 30 for detecting multiple signatures. Graph 30 represents six signatures, known as "HTML signatures" and identified at the leaf nodes as Sig 10–Sig 15. The signatures are composite signatures in that they comprise information from multiple packets.

At the parent node 31, an incoming datastream is identified as a TCP datastream. A level-one function determines whether the TCP Source Port or TCP Destination Port identified in the datastream is Port 80. Traversal through level-two nodes, HTTP Src 32*a* and HTTP Dst 32*b*, depends on the results of the level-one function. Each level-two node has an associated function, here, functions that detect whether the phrase "HTML page has" or the phrase "request for" is used, respectively. These level-two functions determine the path of any transition to the level-three nodes 33*a* and 33*b*. A set of level-three functions determines whether the matching process will reach the leaf nodes 34*a*–34*f*.

In this manner, the decision graph is traversed until a signature is detected or none is detected. As described above, the outcome of the process may result in an alarm or other signal, if a signature is detected.

Figure 4:
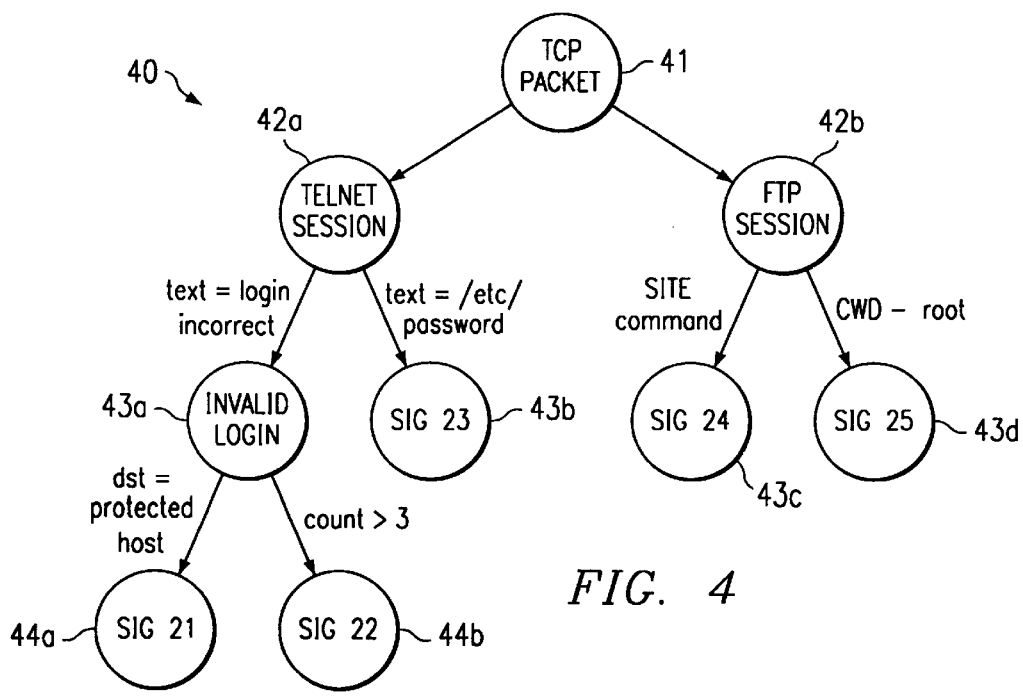
FIG. 4 illustrates a set of five atomic signatures represented by a single decision graph.

FIG. 4 illustrates another example of a decision graph 40 for detecting multiple signatures. Graph 40 represents five signatures, known as "telnet signatures" and "FTP signatures" and identified at the leaf nodes as Sig 21–Sig 25. The signatures are atomic signatures in that they comprise information from a single packet.

At the parent node 41, an incoming packet is identified as a TCP packet. A level-one function determines whether the session identified in the packet is a telnet or FTP session. Traversal to level-two nodes, Telnet Session 42*a* and FTP session 42*b*, depends on the results of the level-one function. From the level-two Telnet Session node 42*a*, the packet is examined to determine if it contains the text "login incorrect" or "/etc/password". The latter indicates a signature at node 43*b*. The former results in a transition to a level-three node 43*a*, which represents an invalid login. From this event, the process determines whether there is a path to one of two possible misuse signatures at nodes 44*a* and 44*b*. Similarly, from the level-two FTP Session node 42*b*, a function examines the packet to determine if it contains the SITE command or if CWD˜root is detected. If so, the traversal continues to the appropriate level-three node 43*c* or 43*d*, which represent detection of Sig 24 or Sig 25, respectively.

Figure 5:
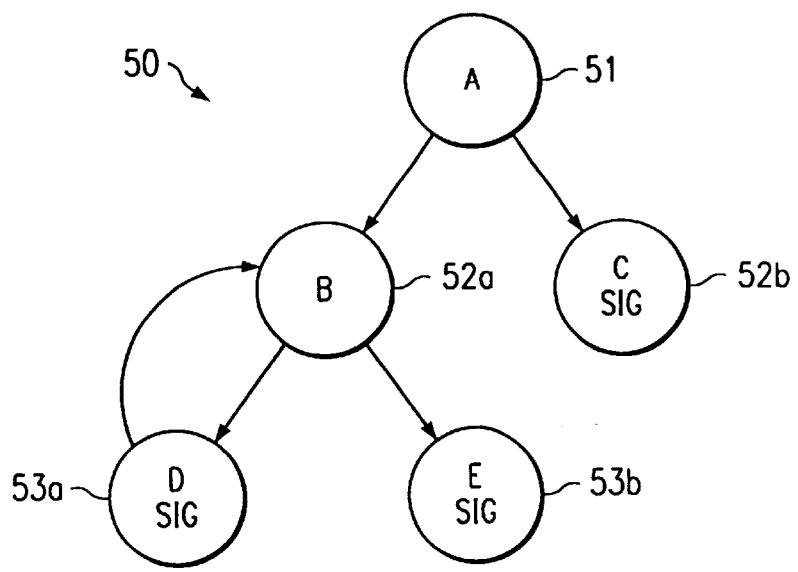
FIG. 5 illustrates an example of a decision graph having a loop.

FIG. 5 illustrates how a decision graph 50 might be used with a loop. As indicated, graph 50 represents three different signatures. A first signature is comprised of the events represented by a path connecting nodes 51 and 52*b* (events A and C). A second signature is comprised of the events represented by a path connecting nodes 51, 52*a*, and 53*b* (events A, B, and E). A third signature contains a loop and looks for repetition of event B. It is represented by a path connecting nodes 51, 52*a*, and 53*a*, where the segment between 52*a* and 53*a* is a loop (events A, B, B, . . . C).

As indicated by each of the above examples, given a set of reference signatures, common events can be identified and multiple signatures can be represented with the same decision graph. Thus, the number of decision graphs is smaller than the number of reference signatures. The use of shared decision graphs avoids the need to restart the matching process each time a datastream "fails" a test for a particular reference signature.

Decision graphs can be created using a "compilation" process that converts a signature description into the decision graph. The signature descriptions may be expressed with conventional signature data or with regular expressions as described above. In other words, the use of decision graphs is not dependent on the method of describing the signatures. However, the use of regular expressions is designed to provide flexibility in the types of events that may be described and used in decision graphs.

Figure 6:
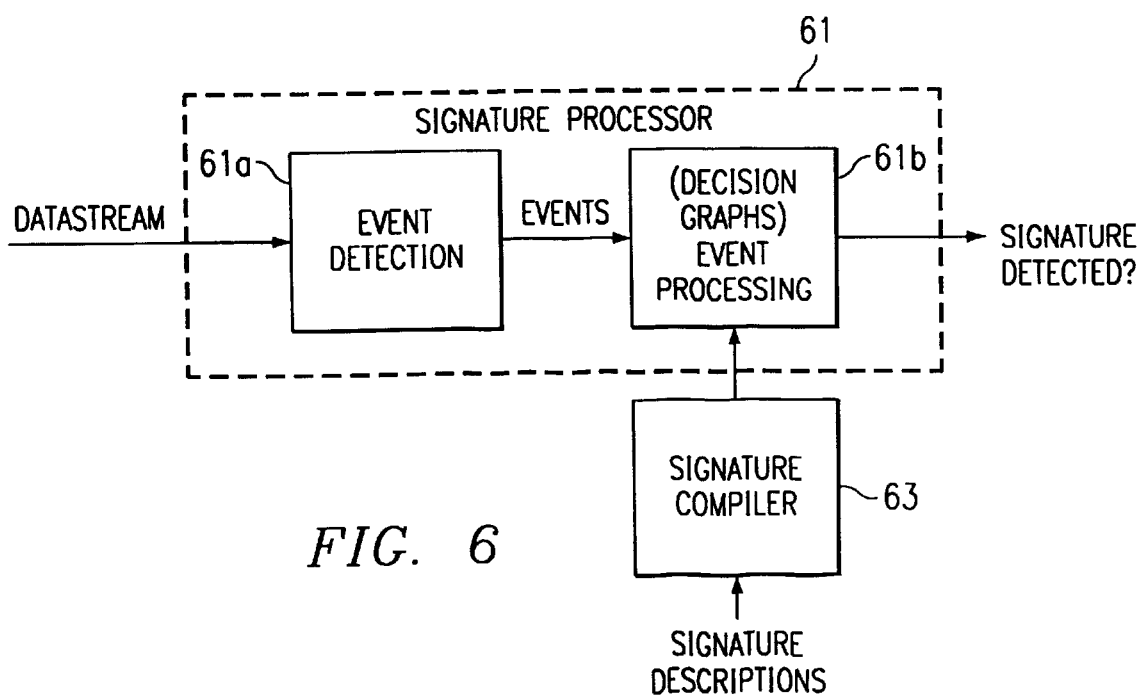
FIG. 6 is a functional block diagram of a signature detection process in accordance with the invention.

FIG. 6 illustrates signature processing using decision graphs, as well as the generation of the decision graphs. A signature processor 61 may be functionally divided into two parts: an event detector 61a and an event processor 61b.

During event detection, as performed by event detector 61a, a data stream incoming to the local (protected) network is processed to detect signature events. These events may be of various types, such as events detected from information in a packet, from information across a session, from information across multiple sessions, or from occurrences external to the datastream itself such as time outs or counts. For purposes of this description, a decision graph may operate on any one type of event or any combination of event types. As explained above, where decision graphs have been produced from regular expressions, there may be greater flexibility in the type of events that may be detected, but the use of regular expressions to describe signatures is not necessary to the use of decision graphs.

Events are passed to event processor 61b, during which decision graphs are used to process the events. As explained above, shared decision graphs may be used so that each graph represents a set of stored reference signatures that have at least one common event. Events are used to traverse the decision graphs and determine the outcome of functions, to detect whether there is a match to a reference signature.

The decision graphs themselves may be provided by a "compiler" 63, which receives signature descriptions and generates the graphs. Where the signatures are described with regular expressions, the use of known compilation techniques is facilitated.

Other Embodiments

Although the present invention has been described in detail, it should be understood that various changes, substitutions, and alterations can be made hereto without departing from the spirit and scope of the invention as defined by the appended claims.

What is claimed is:

1. A method of using a signature processor to detect signatures in an incoming datastream, the signatures representing intrusion to a local network, comprising the steps of:

selecting at least two reference signatures having at least one common event;

representing each said common event as a node of a decision graph;

representing a non-common event associated with each signature as a subsequent level node of said decision graph;

defining at least one function for each said signature, for determining a transition between nodes associated with that signature;

providing events indicated by said datastream as input to said decision graph; and traversing said decision graph so as to determine whether said events comprise a signature that matches one of said reference signatures;

wherein said events are of at least one event type.

2. The method of claim 1, wherein at least one event is of a type indicated by information within single packet of said datastream.

3. The method of claim 1, wherein at least one event is of a type indicated by information within a session of said datastream.

4. The method of claim 1, wherein at least one event is of a type indicated by information across multiple sessions said datastream.

5. The method of claim 1, wherein at least one event is of a type indicated by occurrences related to said datastream.

6. The method of claim 1, wherein said decision graph is a decision tree.

7. The method of claim 1, wherein said decision graph contains a loop, such that said subsequent level event may transition back to a common event.

8. A computer-readable memory device encoded with a data structure for representing multiple signatures associated with misuse of a network, comprising:

a decision graph, having the following elements: at least one node representing an event common to said multiple signatures; at least two subsequent nodes, each of which represent an event not common to said multiple signatures; at least two leaf nodes, each of which is associated with one of said multiple signatures; and a function associated with each node that is not a leaf node, for determining transitions between nodes;

wherein said event common to said multiple signatures and said event not common to said multiple signatures are of at least one event type.

9. The computer-readable memory device of claim 8, wherein at least one event is of a type indicated by information within single packet of said datastream.

10. The computer-readable memory device of claim 8, wherein at least one event is of a type indicated by information within a session of said datastream.

11. The computer-readable memory device of claim 8, wherein at least one event is of a type indicated by information across multiple sessions said datastream.

12. The computer-readable memory device of claim 8, wherein at least one event is of a type indicated by occurrences related to said datastream.

13. The computer-readable memory device of claim 8, wherein said decision graph is a decision tree.

14. The computer-readable memory device of claim 8, wherein said decision graph comprises a loop for transitioning a subsequent level event back to a common event.

15. A method of generating a decision graph for representing multiple signatures representing misuse of a local network, comprising the steps of:

describing a set of reference signatures with a regular expression language;

compiling the regular expressions representing the reference signatures, such that said reference signatures are parsed in terms of events; and generating a decision graph as the output of said compiling step, said decision graph having nodes representing occurrences of events, wherein said events are of at least one event type, and said decision graph having functions determining transitions between nodes, and said decision graph having leaf nodes each of which represent the bottom of a path of said decision graph that connects nodes associated with events that comprise a signature.

16. The method of claim 15, wherein at least one event is of a type indicated by information within single packet of said datastream.

17. The method of claim 15, wherein at least one event is of a type indicated by information within a session of said datastream.

18. The method of claim 15, wherein at least one event is of a type indicated by information across multiple sessions said datastream.

19. The method of claim 15, wherein at least one event is of a type indicated by occurrences related to said datastream.

20. The method of claim 15, wherein said decision graph is a decision tree.

21. The method of claim 15, wherein said decision graph contains a loop, such that said subsequent level event may transition back to a common event.

22. The method of claim 15, wherein said step of generating a decision graph is performed by selecting at least two reference signatures having at least one common event, representing each said common event as a node of a decision graph, and representing a non-common event associated with each signature as a subsequent level node of said decision graph.

23. A method of using a signature processor to detect signatures in an incoming data stream, the signatures representing intrusion to a local network, comprising:
selecting at least two reference signatures having a common event and at least one non-common event;
representing the common event as a corresponding node of a decision graph;
representing the at least one non-common event as a subsequent level node of the decision graph;
defining a function for a path that associates the corresponding node and the subsequent level node, the function representing at least one criterion for transitioning from the corresponding node and the subsequent level node;
identifying one or more events indicated by the data stream; and
traversing the decision graph to determine that the identified one or more events form a signature that matches one of the at least two reference signatures, wherein traversing the decision graph comprises,
determining that one of the one or more events matches the corresponding node,
determining that the at least one criterion of the function for the path that associates the corresponding node and the subsequent level node is met, and
in response to the determination that the at least one criterion is met, determining that another one of the one or more events that is subsequent to the one of the one or more events matches the subsequent level node.

24. The method of claim 23, wherein the one or more events are indicated by a single packet of the data stream.

25. The method of claim 23, wherein the one or more events are indicated by information within a session of the data stream.

26. The method of claim 23, wherein the one or more events are indicated by information across multiple sessions of the data stream.

27. The method of claim 23, wherein the one or more events are indicated by one or more occurrences related to the data stream.

28. The method of claim 23, wherein the decision graph is a decision tree.

29. The method of claim 23, wherein the decision graph further comprises a loop indicating a transition from the subsequent level node back to the common node.

30. An apparatus, comprising:
a program stored on a computer readable medium and operable, when executed on a processor, to:
access a decision graph having,
a node representing a common event of at least two reference signatures,
a subsequent level node representing at least one non-common event of the at least two reference signatures,
a path associating the node and the subsequent level node, the path having a function representing at least one criterion for transitioning from the node to the subsequent level node;
identify one or more events indicated by the data stream;
determine that the identified one or more events form a signature that matches one of the at least two reference signatures by traversing the decision graph, wherein traversing the decision graph comprises,
determining that one of the one or more events matches the node,
determining that the at least one criterion of the function for the path that associates the node and the subsequent level node is met, and
in response to the determination that the at least one criterion is met, determining that another one of the one or more events that is subsequent to the one of the one or more events matches the subsequent level node.

31. The apparatus of claim 30, wherein the one or more events are indicated by a single packet of the data stream.

32. The apparatus of claim 30, wherein the one or more events are indicated by information within a session of the data stream.

33. The apparatus of claim 30, wherein the one or more events are indicated by information across multiple sessions of the data stream.

34. The apparatus of claim 30, wherein the one or more events are indicated by one or more occurrences related to the data stream.

35. The apparatus of claim 30, wherein the decision graph is a decision tree.

36. The apparatus of claim 30, wherein the decision graph further comprises a loop indicating a transition from the subsequent level node back to the node.

37. An apparatus, comprising:
means for storing a decision graph having,
a node representing a common event of at least two reference signatures,
a subsequent level node representing at least one non-common event of the at least two reference signatures,
a path associating the node and the subsequent level node, the path having a function representing at least one criterion for transitioning from the node to the subsequent level node;
means for identifying one or more events indicated by the data stream; and
means for accessing the decision graph, comparing at least a part of the identified one or more events to at least a portion of the decision graph, and determining that the identified one or more events form a signature that matches one of the at least two reference signatures by traversing the decision graph, wherein traversing the decision graph comprises,
determining that one of the one or more events matches the node,
determining that the at least one criterion of the function for the path that associates the node and the subsequent level node is met, and
in response to the determination that the at least one criterion is met, determining that another one of the one or more events that is subsequent to the one of the one or more events matches the subsequent level node.

* * * * *